US012808466B2

(12) United States Patent
Arment et al.

(10) Patent No.: US 12,808,466 B2
(45) Date of Patent: Nov. 24, 2026

(54) SWAGE FITTING FOR TUBING CONNECTIONS AND METHOD

(71) Applicant: RLS LLC, Shelbina, MO (US)

(72) Inventors: Bradley Michael Arment, Shelbyville, MO (US); Sean Patrick Kelleher, Manchester, MO (US); Austin Keith Lowry, St. Louis, MO (US)

(73) Assignee: RLS LLC, Shelbina, MO (US)

( * ) Notice: Subject to any disclaimer, the term of this patent is extended or adjusted under 35 U.S.C. 154(b) by 0 days.

(21) Appl. No.: 18/363,161

(22) Filed: Aug. 1, 2023

(65) Prior Publication Data

US 2025/0043890 A1 Feb. 6, 2025

(51) Int. Cl.
*F16L 13/14* (2006.01)

(52) U.S. Cl.
CPC .................................. *F16L 13/142* (2013.01)

(58) Field of Classification Search
CPC ....... F16L 13/142; F16L 13/14; F16L 13/141; F16L 13/16; F16L 13/161
USPC .......................................................... 285/382
See application file for complete search history.

(56) References Cited

U.S. PATENT DOCUMENTS

| | | | | |
|---|---|---|---|---|
| 3,690,703 A * | 9/1972 | Philipps | F16L 33/2071 | 29/516 |
| 5,090,743 A * | 2/1992 | Obering | F16L 13/142 | 285/179 |
| 6,012,743 A * | 1/2000 | Godeau | F16L 31/00 | 285/286.2 |
| 6,453,539 B1 * | 9/2002 | Brugmann, Jr. | F16L 13/141 | 29/523 |
| 7,331,613 B2 * | 2/2008 | Schulte | F16L 37/138 | 285/239 |
| 7,686,346 B1 * | 3/2010 | Buccicone | F16L 13/142 | 285/129.1 |
| 7,942,456 B2 * | 5/2011 | Duggan | F16L 13/142 | 285/382 |
| 2014/0197633 A1 * | 7/2014 | Nixon | F16L 13/142 | 29/516 |
| 2016/0061536 A1 * | 3/2016 | Arment | F16L 13/142 | 165/181 |
| 2020/0149664 A1 * | 5/2020 | Sato | F16L 13/142 | |

* cited by examiner

*Primary Examiner* — David Bochna
(74) *Attorney, Agent, or Firm* — Arnold & Porter Kaye Scholer LLP

(57) ABSTRACT

A crimp fitting fluidically joins two sections of tubing, one section of tubing having a straight end and the other section of tubing having an expanded end. The fitting includes a cylindrical body having inner and outer walls, first and second sections and a transition region. The first section inner and outer diameters are greater than the second section inner and outer diameters. An inwardly oriented stop wall is between the first and second sections. First and second protuberances in the body define first and second annular recesses. The expanded end tubing section is positioned in the fitting first section with the expanded end against the stop wall and the straight end tubing section is positioned in the fitting second section with the straight end positioned in the expanded end. Crimps are formed in the fitting to secure the two sections of tubing in the fitting and to one another. A method of making the fitting and a method of using the fitting are also disclosed.

9 Claims, 5 Drawing Sheets

SWAGE FITTING FOR TUBING CONNECTIONS AND METHOD

BACKGROUND

The present disclosure relates to a swage fitting for tubing connections, and a method for making and using the fitting, and more particularly, to a swage fitting for expanded tubing connections and a method for making and using such fittings.

Tubing fittings are used to connect sections of tubing to one another without the use of heat, e.g., without soldering or brazing, to create a leak proof joint. Such fittings are used to join straight runs of tubing and, for example, to join tubing to elbows, tees, and the like.

Tubing fittings are used when joining two sections of straight (not expanded or reduced ends) tubing sections. Such fittings, for example crimp fittings, work well in forming such joints. However, when tubing having expanded ends are joined to one another, soldering or brazing is employed to form the joint. In some instances, soldering or brazing is acceptable. However in many other instances, using heat to form the joint is not desirable. Moreover, such soldered to brazed joints may not be complete, resulting in leaks at the joint.

Accordingly, there is a need for a heatless joint for tubing that uses an expanded end tubing section. Desirably, such a joint uses a heatless fitting, and more desirably a crimp fitting.

SUMMARY

In one aspect of the present disclosure, a fitting fluidically joins two sections of tubing, an end of one section of tubing having a straight end and an end of the other section of tubing having an expanded end. The fitting includes a generally cylindrical body having an inner wall and an outer wall. The fitting terminates at a first end, and has a transition region and a second section terminating at a second end. The first section has a diameter and the second section has a diameter smaller than the diameter of the first section.

An inwardly oriented stop wall is formed between the first section and the second section. A first protuberance in the body define a first annular recess in the inner wall formed in the first section between the first end and the transition region and a second protuberance is formed in the body defining a second annular recess in the inner wall formed in the second section between the second end and the transition region.

The section of tubing having the expanded end is positioned in the fitting first section with an end of the expanded end positioned against the stop wall, and the section of tubing having the straight end is positioned in the fitting second section with an end of the tubing having the straight end positioned in the expanded end.

Crimps are formed in the fitting to secure the two sections of tubing in the fitting and to secure the two sections of tubing to one another. In embodiments, the stop wall is at the transition region. The fitting can further include a first seal in the first recess and a second seal in the second recess.

The wall thickness of the first section can be substantially the same as a wall thickness of the second section. One or both of the first and second ends can be flared.

In embodiments, the first protuberance has a greater outer diameter than an outer diameter of the second protuberance.

A portion of the outer wall at the transition can be removed such that the wall thickness of the first and second regions is substantially equal.

In another aspect, a fitting for fluidically joining two sections of tubing with an end of one section of tubing having a straight end and an end of the other section of tubing having an expanded end is disclosed. The fitting includes a generally cylindrical body having an inner wall and an outer wall, a first section terminating at a first end, a transition region and a second section terminating at a second end. The first section has a diameter and the second section has a diameter smaller than the diameter of the first section.

In embodiments, the fitting includes an inwardly oriented stop wall between the first section and the second section, a tab extending from the stop wall toward the first end and an inwardly oriented step in the inner diameter at the transition region.

A first protuberance is formed in the body defining a first annular recess in the inner wall formed in the first section between the first end and the transition region and a second protuberance is formed in the body defining a second annular recess in the inner wall formed in the second section between the second end and the transition region.

The section of tubing having the expanded end is positioned in the fitting first section with an end of the expanded end positioned against the stop wall, and the section of tubing having the straight end is positioned in the fitting second section with an end of the tubing having the straight end positioned at the step. Crimps are formed in the fitting to secure the two sections of tubing in the fitting.

In some such embodiments a tube end channel is defined between the tab and the first section inner wall. In embodiments at least a portion of the tab is radially aligned with the first annular recess. The stop wall can be positioned between the first annular recess and the transition region.

The fitting can include a first seal in the first recess and a second seal in the second recess. In embodiments one or both of the first and second ends can be flared. The first protuberance can have a greater outer diameter than an outer diameter of the second protuberance.

In embodiments, a portion of the outer wall at the transition is removed. In some such embodiments the wall thickness of the first section can be substantially the same as a wall thickness of the second section.

In still another aspect, a method for making a fitting for fluidically joining two sections of tubing, an end of one section of tubing having a straight end and an end of the other section of tubing having an expanded end, includes boring a first bore in a first end of a cylindrical member, the first bore having a diameter and boring a second bore in a second end of the cylindrical member, the second bore having a diameter different from the first diameter. The first and second bores define first and second regions, and define a transition region therebetween.

The method includes hydroforming and spinning the bored cylindrical member to form a first recess in an inner wall of the first region and a second recess in an inner wall of the second region. The first and second recesses form first and second protuberances in outer walls of the first and second regions, respectively, to form a crimp fitting.

The method can include removing a portion of the outer wall at the transition region. In some methods the wall thickness of the first section can be substantially the same as a wall thickness of the second section.

In yet another aspect, a method of forming a crimp seal to fluidically join two sections of tubing, with an end of one section of tubing having a straight end and an end of the other section of tubing having an expanded end, includes providing a fitting having a generally cylindrical body having an inner wall and an outer wall, a first section terminating at a first end, a transition region and a second section terminating at a second end. The first section has a diameter and the second section has a diameter smaller than the diameter of the first section. Such a fitting can further include an inwardly oriented stop wall between the first section and the second section, a first protuberance in the body defining a first annular recess in the inner wall formed in the first section between the first end and the transition region and a second protuberance in the body defining a second annular recess in the inner wall formed in the second section between the second end and the transition region.

The method further includes positioning the end of the section of tubing having the expanded end in the first region of the fitting abutting the stop wall and positioning the end of the section of tubing having the straight end in the second region of the fitting.

Still further, the method includes forming a crimp in the outer wall of the first section and forming a crimp in the outer wall of the second section.

The method can include positioning the end of the section of tubing having the straight end in the section of tubing having the expanded end. The method can include forming more than one crimp in one or both of the first and second sections.

In some methods. the crimp formed in the first section is between the first protuberance and the first end, and the crimp formed in the second section is between the second protuberance and the second end.

Further understanding of the present disclosure can be obtained by reference to the following detailed description in conjunction with the associated drawings, which are described briefly below.

DESCRIPTION OF THE DRAWINGS

Embodiments of a swage fitting for tubing connections and a methods of making and using same are disclosed as an example and are not limited by the figures of the accompanying drawings, in which like references may indicate similar elements and in which.

DETAILED DESCRIPTION

Figure 1:
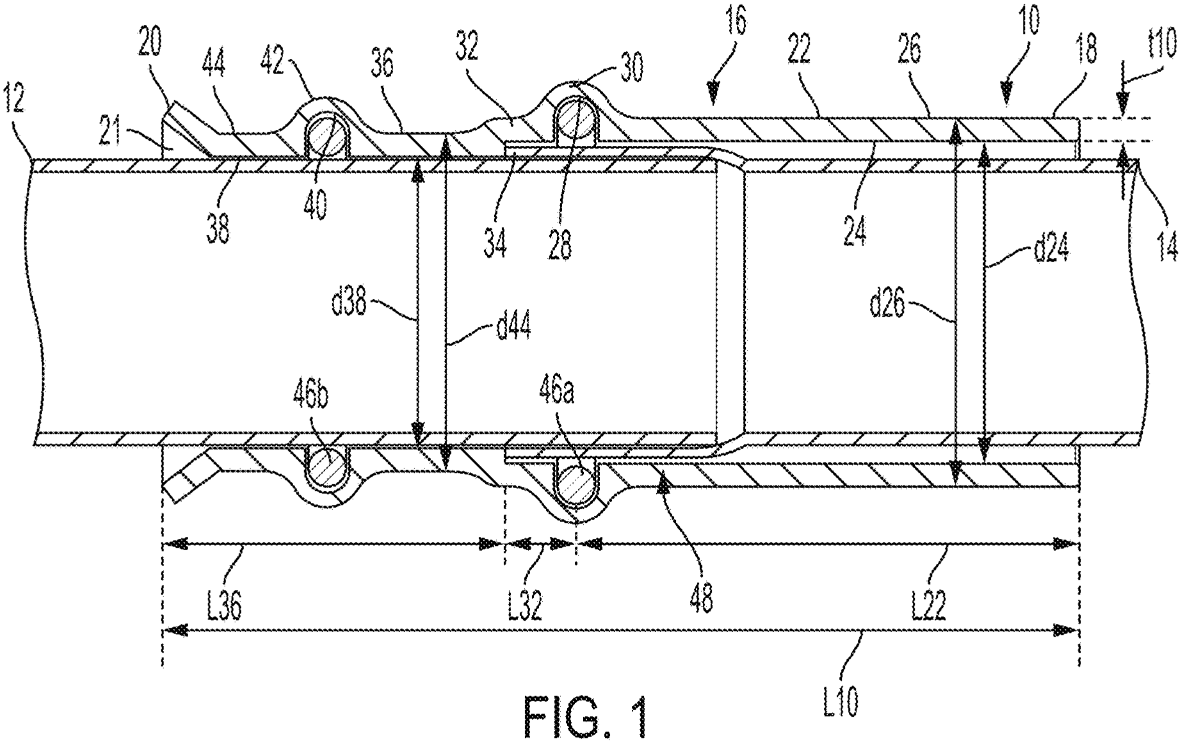
FIG. 1 is a cross-section of an embodiment of a swage fitting for joining sections of tubing prior to crimping the fitting onto the tubing.

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

Figure 2:
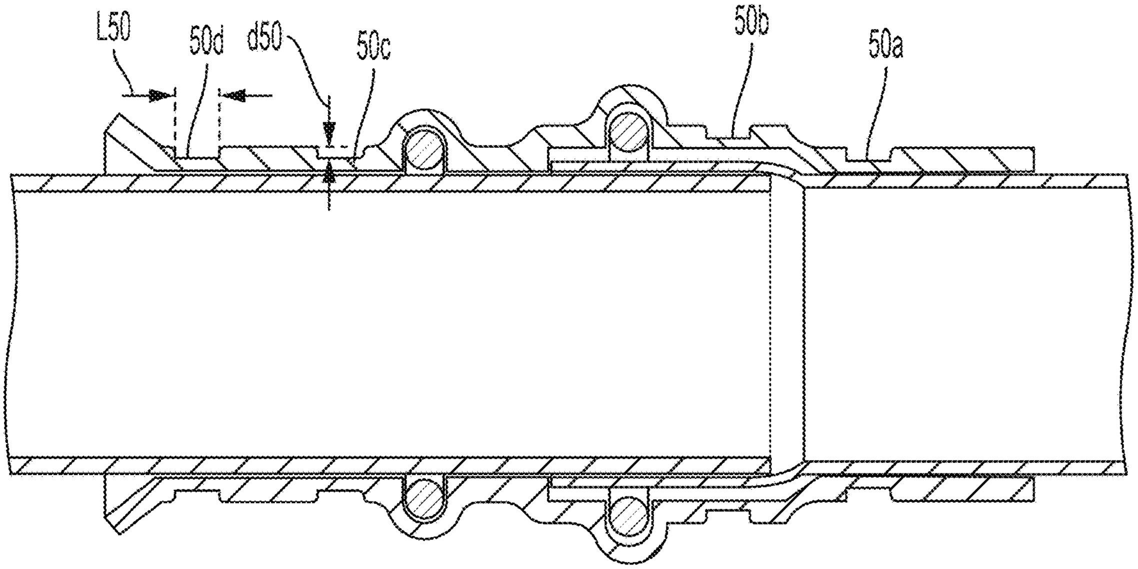
FIG. 2 is a cross-section illustrating the fitting and tubing of FIG. 1 after the fitting has been crimped onto the tubing.

Referring to FIGS. 1 and 2, there is shown an embodiment of a swage crimp fitting 10 that is configured to join two sections of tubing, one section 12 being a straight section and the other section 14 having an enlarged or expanded end into which the straight section of tubing 12 is inserted.

The fitting 10 is a cylindrical tubular body 16 having a first end 18 and a second end 20. A first section 22 has an inner wall 24 and an outer wall 26, an inner diameter d24, and an outer diameter d26, and a first annular recess 28 formed in the body 16. The annular recess 28 defines a first annular protuberance 30 in the first section outer wall 26. The outer diameter d26 continues beyond the first protuberance 30 to a transition region 32. An inwardly oriented stop wall 34 is formed in the inner wall 24 at the transition region 32.

The transition region 32 defines the transition from the fitting first section 22 to a second section 36. The inward stop wall 34 transitions the first section inner diameter d24 to a second section inner diameter d38 that is less than the first section inner diameter d24. The transition region 32 also transitions the first section outer diameter d26 to a second section outer diameter d44 that is less than the first section outer diameter d26. The transition 32 is formed by removing a portion of the outer wall 26 at the transition region 32 so that the fitting wall thickness t10 is substantially the same at the first and second sections 22, 36.

The second section inner wall 38 extends to a second annular recess 40 in the inner wall 38 that defines a second annular protuberance 42 in the second section outer wall 44. The second section outer diameter d44 continues to the fitting second end 20. In the illustrated embodiment, the fitting second end 20 is flared as at 21 to facilitate insertion of the tubing section 12. In embodiments, both ends of the fitting can be flared or neither end is flared. Seals 46 (46*a*, 46*b*), such as O-ring seals are positioned in the annular recesses 28, 40.

FIGS. 1 and 2 illustrate the tubing sections 12, 14 positioned in the fitting 10, in which in FIG. 1, the fitting 10 is not yet crimped and in FIG. 2, the fitting 10 is crimped or pressed. Referring to FIG. 1, the tubing straight section 12 and the tubing expanded end section 14 are shown prior to crimping the fitting 10. The straight section 12 is inserted into the fitting 10 at the second end 20 (the smaller diameter) and the expanded section 14 is inserted into the fitting 10 at the first end 18 (the larger diameter). The end of the expanded section of tubing 14 is inserted into the fitting 10 to abut the inwardly oriented stop wall 34, which prevents over insertion of the tubing 14 end. The straight section of tubing 12 is inserted into the fitting 10 and into the tubing expanded end 14. The overlap of the tubing sections 12, 14, (where the tubing straight section 12 is inserted into the tubing expanded end 14, as indicated at 48), is positioned at the first recess 28 and first seal 46*a*. With the tubing 12, 14, installed in the fitting 10, the second seal 46*b* is positioned along the tubing straight section 12 spaced from the tubing overlap 48, between the overlap 48 and the fitting second end 20.

Referring now to FIG. 2, the fitting 10 has been crimped onto the tubing 12, 14. The crimps 50 are formed outboard of the first and second protuberances 30, 42, and as such, outboard of the seals 46*a*, 46*b*. In the illustrated embodiment, four crimps 50*a*, 50*b*, 50*c*, 50*d* are formed in the fitting 10, two crimps 50*a* 50*b* are formed in the fitting first section 22 outboard of the first protuberance 30 and seal 46*a* and two crimps 50*c*, 50*d* are formed in the second fitting section 36 outboard of the second protuberance 42 and seal 46*b*.

A first crimp 50*a* in the fitting first section 22 is formed in the fitting outboard of where the fitting 10 overlies the overlap 48 of the tubing sections 12, 14, and a second crimp 50*b* in the fitting first section 22 is formed between the first protuberance 30 (and seal 46*a*) and the first crimp 50*a* and at the overlap 48. The second crimp 50*b* in the first section 22 reduces the diameter of the first section 22 outboard of the tubing section overlap 48.

The first and second crimps 50*c*, 50*d* in the fitting second 36 section are formed in the fitting 10 outboard of the second protuberance 42 (and seal 46*b*) and between the second protuberance 42 (and seal 46*b*) and the fitting second end 20. In the illustrated embodiment there are no crimps between the first and second protuberances 30, 42 (and seals 46*a*, 46*b*).

It will be appreciated that although two crimps 50 are shown at each of the first and second fitting sections 22, 36, the number of crimps 50 on either side of the seals 46*a*, 46*b* (in the first and section fitting sections 22, 36) can be more or less than two.

Figure 6:
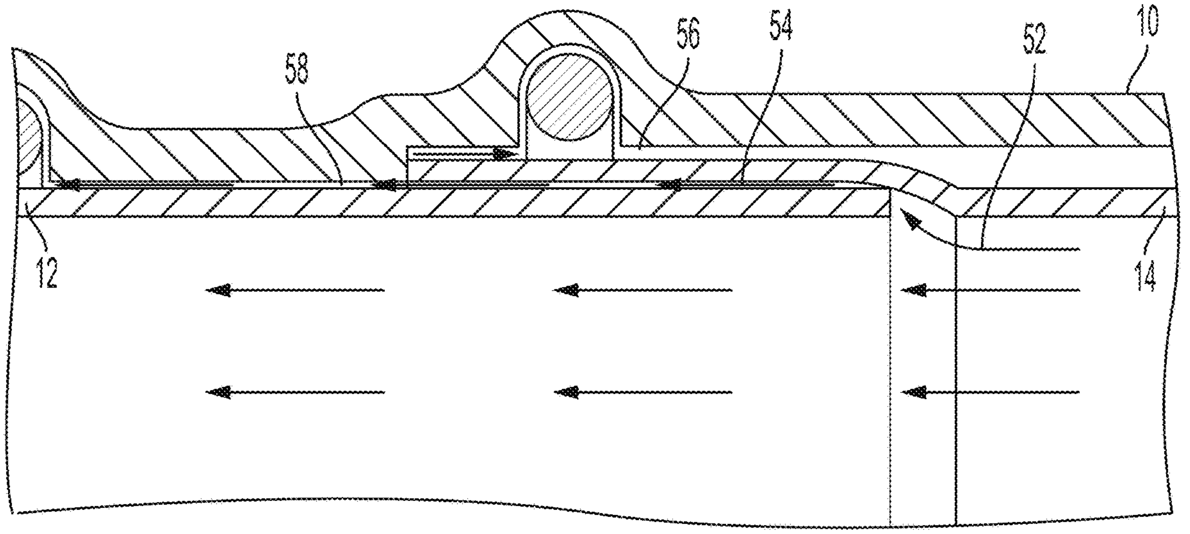
FIG. 6 shows the hypothetical leak paths through the fitting after crimping the fitting onto the tubing sections.
Figure 7:
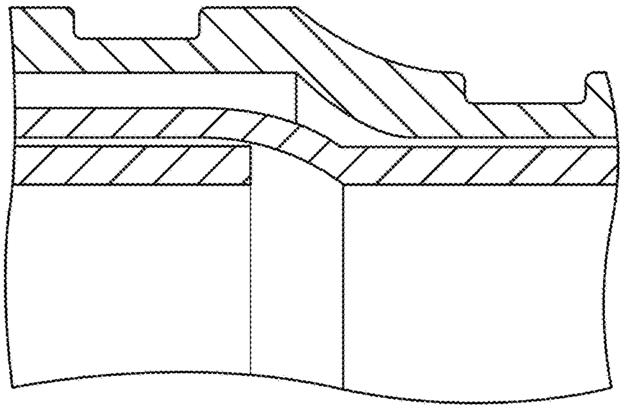
FIG. 7 is an enlarged view of a portion of the crimped fitting.

Referring briefly to FIG. 6, an enlarged partial section of the fitting 10 and tubing 12, 14 is shown with a direction of flow (indicated at 52) in the tubing 12, 14 from the expanded end tubing section 14 to the straight end tubing section 12. It will be appreciated that fluid may leak/flow into the space (indicated at 54) between the tubing sections 12, 14 at the overlap 48. From that region, there are two potential leak paths. A first leak path 56 is into the space 54 between the fitting 10 and tubing expanded end 14 and toward the first seal 46*a*, however, the first seal 46*a* prevents leakage from the fitting beyond the first seal 46*a*. The second leak path 58 is beyond the overlap 48, between the fitting 10 and the straight tubing section 12 toward the second seal 46*b*. However, the second seal 46*b* prevents leakage from the fitting 10 beyond the second seal 46*b*.

In one example, for a fitting 10 for use with ¾ inch OD tubing 12,14, one example of a fitting 10 formed and prior to crimping has dimensions in inches of: overall length (L10)—2.390, first section length (L22)—1.509, second section length (L36)—0.881, center of first protuberance to transition region (60)—0.195; first section inner diameter (d24)—0.840, outer diameter (d26)—0.960, wall thickness (t10)—0.060; second section inner diameter (d38)—0.760, outer diameter (d44)—0.880, wall thickness (t10)—0.060; first and second recesses (28)—0.057 radius.

The fitting after crimping has crimps having a length (L50)—0.110, depth (d50)—0.030.

It will be appreciated that the dimensions of the fittings, as well as the number, size, and locations of the crimps are examples only, that the number, size, and locations of the crimps can vary, and that all such variations ae within the scope and spirit of the present disclosure.

Figure 3:
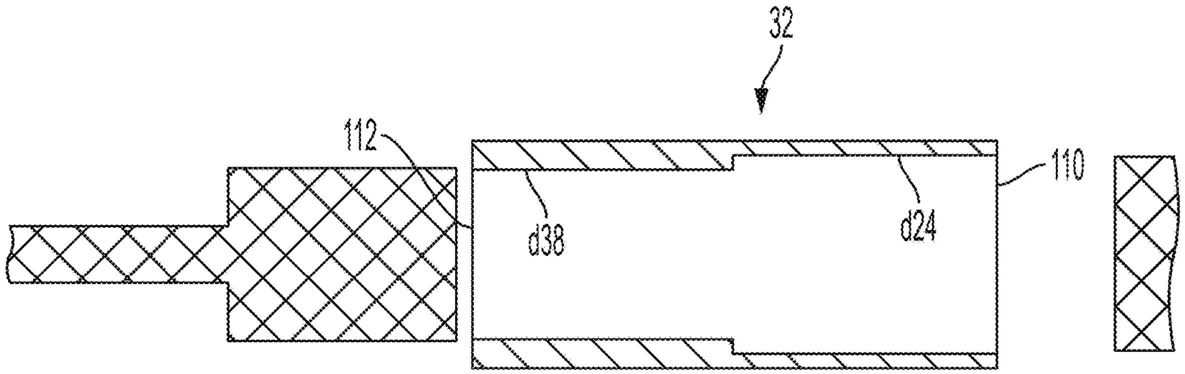
FIG. 3 is an illustration of the fitting in an early stage of forming/fabrication after the stepped through bore has been formed in the fitting.
Figure 4:
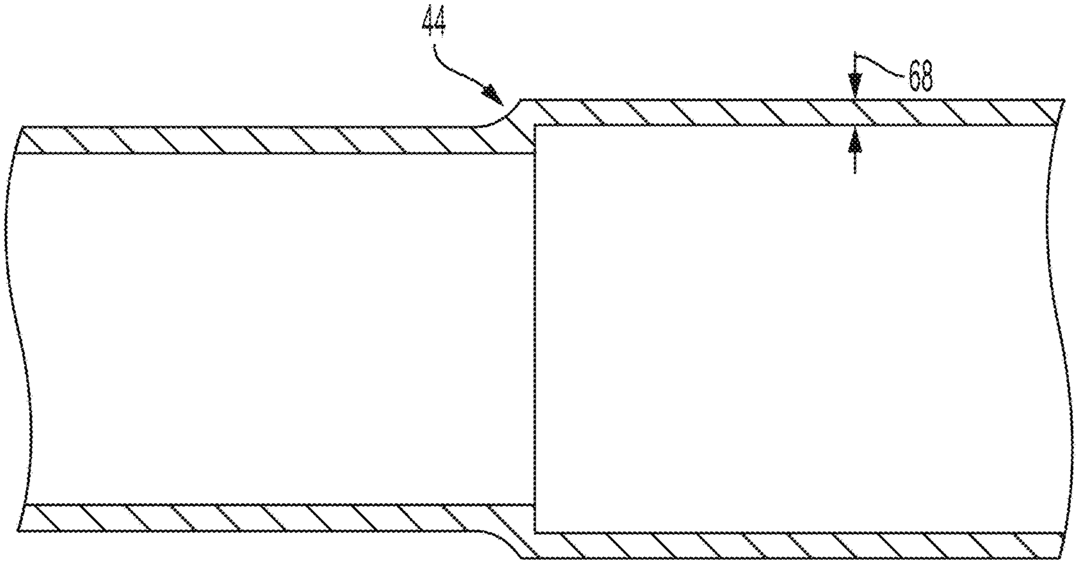
FIG. 4 is an enlarged illustration of the partially formed fitting after stepped through bore formation and outer wall machining.
Figure 5:
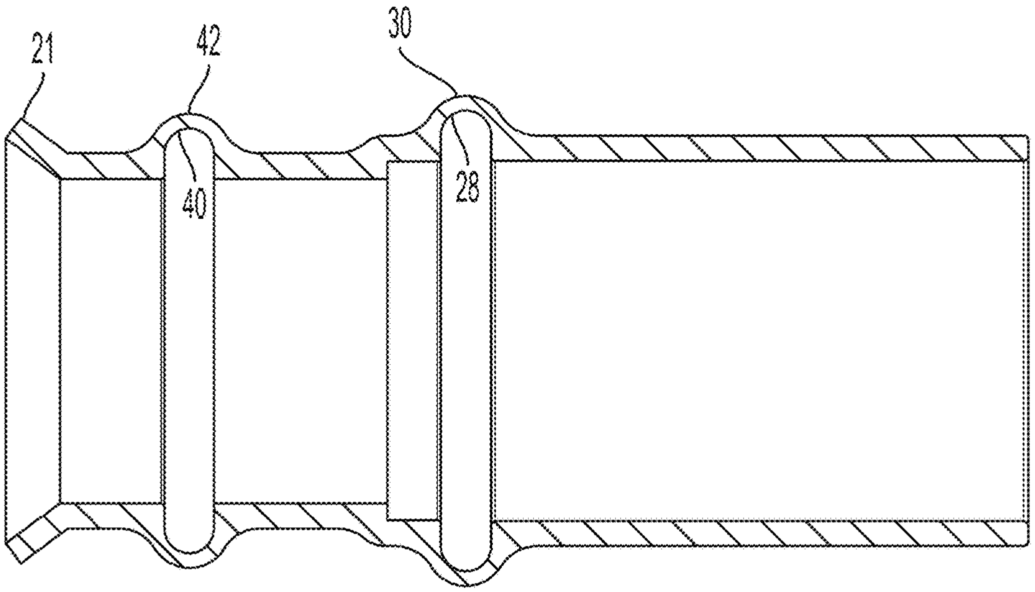
FIG. 5 is a cross-sectional illustration of the fitting after hydroforming/spinning.

Referring now to FIG. 3, the first step in forming the fitting 10 is forming two bores in a fitting blank. The first bore 110 forms the first section inner diameter d24 and the second bore 112 forms the second section inner diameter d38. As shown in FIG. 4, material is then removed from the second section outer diameter wall 44 so that the wall thickness 68 of the first and second sections 24, 36 is substantially equal. At the transition 32 region, the material may be removed to form a radiused area so as to maintain a wall thickness at the thinnest location at least equal to the wall thickness of the fitting first and second sections. FIG. 5 illustrates the fitting after hydroforming/spinning the fitting to form the recesses 28, 40 and the flared end(s) 21 if desired.

Figure 8:
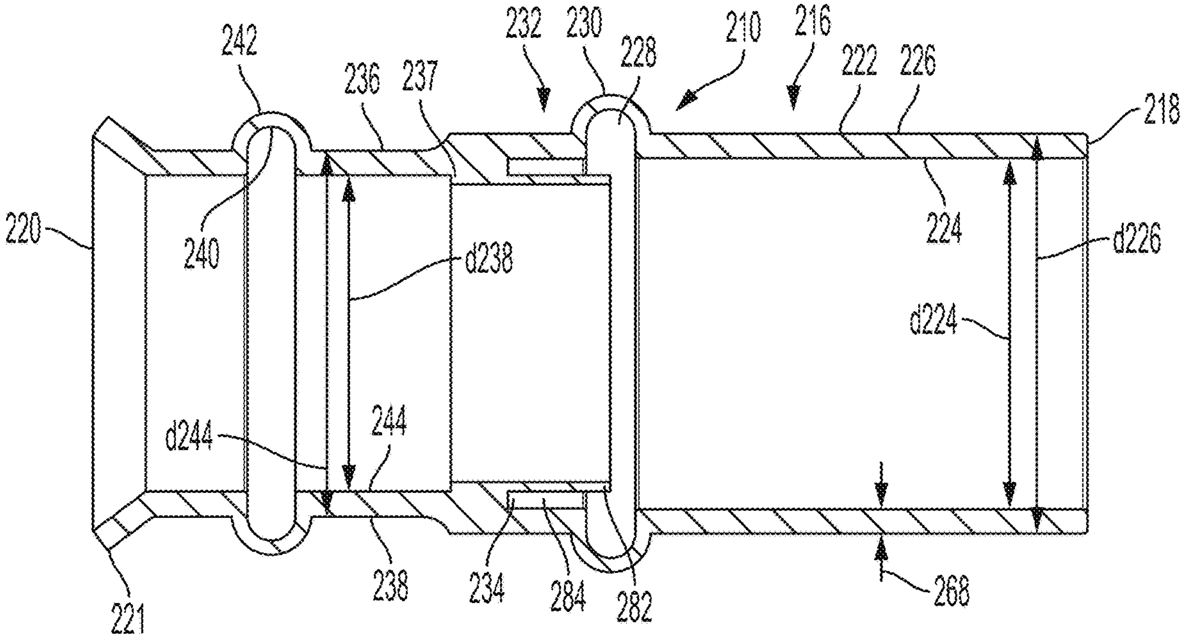
FIG. 8 is a cross-sectional view of another embodiment of a swage fitting for joining sections of tubing prior to crimping the fitting onto the tubing.

FIG. 8 illustrates another embodiment of the fitting 210. This embodiment is similar to the embodiment 10 of FIGS. 1 and 5 and includes a body 216 having a first section 222 having an inner wall 224 and an outer wall 226, an inner diameter d224, and an outer diameter d226, and a first annular recess 228 formed in the body 216. The annular recess 228 defines a first annular protuberance 230 in the first section outer wall 226, and the outer diameter d226 continues beyond the first protuberance 230 to a transition region 232. An inwardly oriented stop wall 234 is formed in the inner wall 224 between the first protuberance 230 and the transition 232.

The transition region 232 defines the transition from the fitting first section 222 to a second section 236, and an inwardly oriented step 237 transitions the first section inner diameter d224 to a second section inner diameter d238 that is less than the first section inner diameter d224. The transition region 232 also transitions the first section outer diameter d226 to a second section outer diameter d244 that is less than the first section outer diameter d226. The transition 232 is formed by removing a portion of the outer wall 244 at the transition region 232 so that the fitting wall thickness 268 is substantially the same at the first and second sections 222, 236.

The second section inner wall 238 extends to a second annular recess 240 in the inner wall 238 that defines a second annular protuberance 242 in the second section outer wall 244. The second section outer diameter 272 continues to the second end 220 of the fitting 210. Again, in the illustrated embodiment, the fitting second end 220 is flared as at 221 to facilitate insertion of the tubing section. In embodiments, both ends 218, 220 of the fitting 210 can be flared, one end of the fitting can be flared, or neither end of the fitting is flared. Seals 246, such as O-ring seals are positioned in the annular recesses 228, 240.

Figure 9:
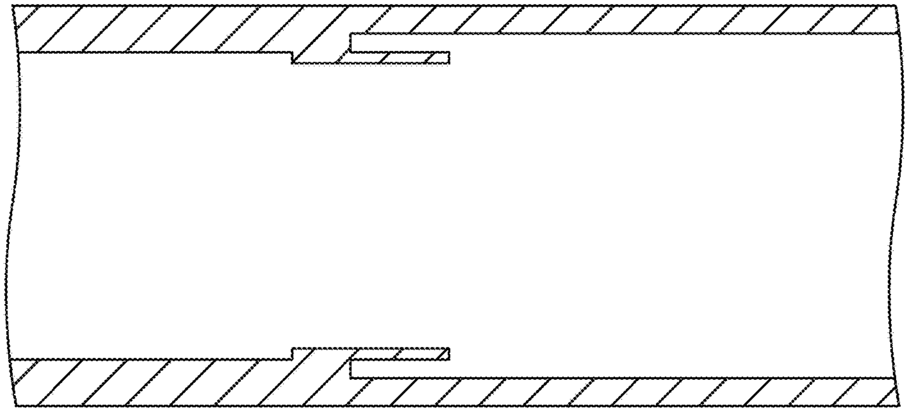
FIG. 9 is a partial cross-sectional view of the fitting of FIG. 8 in an early stage of forming/fabrication.

The fitting 210 further includes a straight tube end stop wall 234 at the transition region 232 and a wall or tab 282 extending from the stop wall 234 toward the first section 222 and inward relative to the first protuberance 230 to define a tube end channel 284. The tab 282 defines a smaller inner diameter than that of the first and second sections 222, 236. FIG. 9 illustrates a step in forming the fitting 210.

Figure 10:
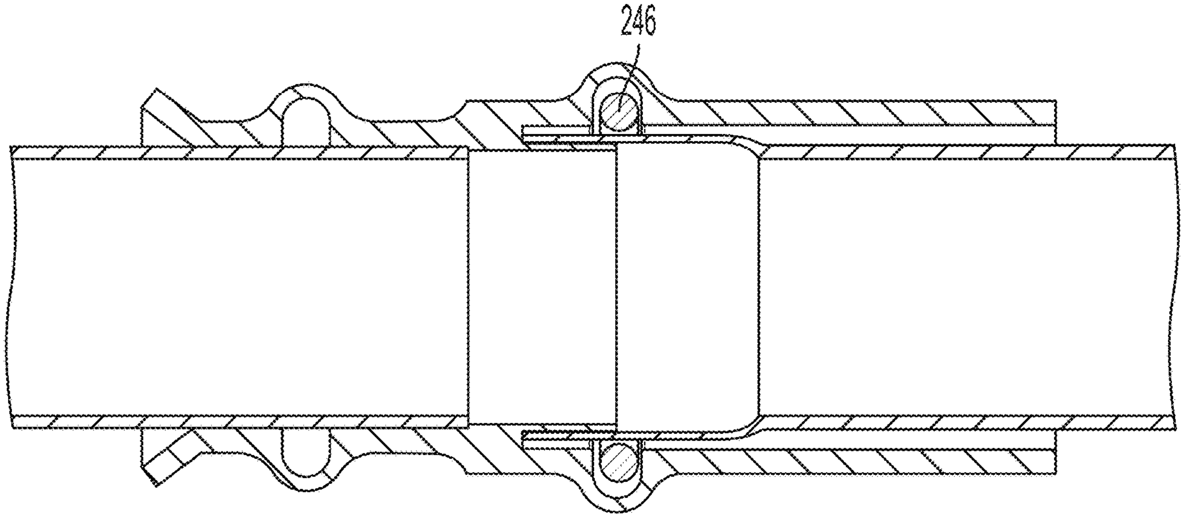
FIG. 10 is a cross-section illustrating the fitting of FIG. 8 showing the tubing positioned in the fitting prior to crimping.

Tubing is inserted into the fitting 210 with the end of the straight section 12 of one tube inserted up to the inwardly oriented step 237. The expanded end 214 of the tube is inserted into the fitting 210 with the expanded end 214 positioned in the tube end channel 284. In this configuration, the end of the straight section 12 of tubing is not positioned in the expanded end 14 of the other section of tubing; that is, the tubing sections 12, 14 do not fit together. Rather, as seen in FIG. 10, the tubing ends are separately positioned in the fitting 210.

Crimps, although not shown, are formed in much the same manner and substantially the same locations as that of the embodiment of FIG. 2, except that the expanded end 14 is positioned between the tube end channel 284 and the straight end of the other tube 12 is positioned abutting the inwardly oriented step 237. An advantage of such an embodiment is that the tab 282 provides a surface against which a crimp is formed.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as side(s), upper, lower, top, bottom, rearward, inboard, forward, outboard and the like may be for explanatory purposes only and may not be intended to limit the scope of the disclosure.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

What is claimed is:

1. A fitting for fluidically joining two sections of tubing with an end of one section of tubing having a straight end and an end of the other section of tubing having an expanded end, the fitting comprising:

a generally cylindrical body having an inner wall and an outer wall, a first section terminating at a first end, a transition region, and a second section terminating at a second end, the second section having a diameter smaller than a diameter of the first section;

an inwardly oriented stop wall between the first section and the second section;

a tab extending from the stop wall toward the first end;

an inwardly oriented step in the inner diameter at the transition region;

a first protuberance in the body defining a first annular recess in the inner wall formed in the first section between the first end and the transition region;

a second protuberance in the body defining a second annular recess in the inner wall formed in the second section between the second end and the transition region; and wherein the first section of the fitting is configured to receive a first section of tubing having an expanded end with the expanded end positioned against the stop wall and within a channel formed between the tab and an inner wall of the first section of fitting, and wherein the second section of the fitting is configured to receive a second section of tubing having a straight end with the straight end positioned against the step, and wherein the fitting is configured to both secure the first section of tubing and the second section of tubing in the fitting via crimps in the fitting.

2. The fitting of claim 1, wherein a tube end channel is defined between the tab and the first section inner wall.

3. The fitting of claim 1, wherein at least a portion of the tab is radially aligned with the first annular recess.

4. The fitting of claim 1, wherein the stop wall is between the first annular recess and the transition region.

5. The fitting of claim 1, further including a first seal in the first recess and a second seal in the second recess.

6. The fitting of claim 1, wherein a wall thickness of the first section of the fitting is substantially the same as a wall thickness of the second section of the fitting.

7. The fitting of claim 1, wherein one or both of the first and second ends is flared.

8. The fitting of claim 1, wherein the first protuberance has a greater outer diameter than an outer diameter of the second protuberance.

9. The fitting of claim 1, wherein a portion of the outer wall at the transition region is removed such that a wall thickness of the transition region is substantially the same as a wall thickness of the first section of the fitting and a wall thickness of the second section of the fitting.

* * * * *